(12) United States Patent
Saito (10) Patent No.: US 8,259,317 B2
(45) Date of Patent: Sep. 4, 2012

(54) IMAGE PROCESSING SYSTEM AND IMAGE PROCESSING CONDITION SETTING PROGRAM

(75) Inventor: Takuma Saito, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 659 days.

(21) Appl. No.: 12/408,765

(22) Filed: Mar. 23, 2009

(65) Prior Publication Data

US 2009/0323101 A1 Dec. 31, 2009

(30) Foreign Application Priority Data

Jun. 26, 2008 (JP) .................................. 2008-167475

(51) Int. Cl.
*G06F 3/12* (2006.01)

(52) U.S. Cl. ...... 358/1.13; 358/1.15; 358/474; 345/100; 345/700

(58) Field of Classification Search .................... 358/1.9, 358/1.13, 1.15, 474, 523
See application file for complete search history.

(56) References Cited

U.S. PATENT DOCUMENTS

| | | | |
|---|---|---|---|
| 6,327,051 B1 | 12/2001 | Moro et al. | |
| 6,704,122 B2 | 3/2004 | Moro et al. | |
| 7,408,674 B2 | 8/2008 | Moro et al. | |
| 2002/0054008 A1* | 5/2002 | Aikawa | 345/100 |
| 2002/0089683 A1 | 7/2002 | Moro et al. | |
| 2003/0053150 A1* | 3/2003 | Murata | 358/474 |
| 2004/0051891 A1* | 3/2004 | Moro et al. | 358/1.9 |
| 2006/0230261 A1* | 10/2006 | Yoshimura et al. | 713/1 |
| 2007/0058186 A1* | 3/2007 | Tanaka | 358/1.9 |
| 2007/0146764 A1* | 6/2007 | Yoshida | 358/1.13 |
| 2008/0273216 A1 | 11/2008 | Moro et al. | |

FOREIGN PATENT DOCUMENTS

| | | |
|---|---|---|
| JP | 4-058673 A | 2/1992 |
| JP | 10-049318 A | 2/1998 |
| JP | 10-222328 | 8/1998 |
| JP | 2004-206553 | 7/2004 |
| JP | 2006-222941 A | 8/2006 |

OTHER PUBLICATIONS

JP Office Action Apr. 22, 2010, JP Appln. 2008-167475, partial English Translation.

\* cited by examiner

*Primary Examiner* — King Poon
*Assistant Examiner* — Allen H Nguyen
(74) *Attorney, Agent, or Firm* — Banner & Witcoff, Ltd.

(57) ABSTRACT

In an image processing system including an image processing portion configured to process an image according to a plurality of processing conditions which are individually settable to a set value, a control portion displays a first setting screen on a display portion, so that the set value of at least one processing condition can be changed on the first setting screen according to an external input. The control portion additionally displays a second setting screen on the display portion in response to change of the set value of a processing condition on the first setting screen, so that the second setting screen includes information on at least one relevant processing condition associated with the changed processing condition, and the set value of the at least one relevant processing condition can be changed on the second setting screen according to an external input.

7 Claims, 10 Drawing Sheets

IMAGE PROCESSING SYSTEM AND IMAGE PROCESSING CONDITION SETTING PROGRAM

CROSS REFERENCE TO RELATED APPLICATION

The present application claims priority from Japanese Patent Application No. 2008-167475 filed on Jun. 26, 2008. The entire content of this priority application is incorporated herein by reference.

TECHNICAL FIELD

The present disclosure relates to an image processing system and an image processing condition setting program.

BACKGROUND

An image forming apparatus, such as a simple printer or a multifunction printer, is conventionally provided. A user can request the image forming apparatus to print an image, while setting various printing conditions on the image forming apparatus or on a computer connected to the image forming apparatus, for example.

A print setting screen can be displayed on the built-in display of the image forming apparatus or on the computer display, so that the user may set the printing conditions on the print setting screen. When a number of setting options are provided for the printing conditions, the print setting screen may include several tabs on which the setting options are displayed in categories. The user can select the options for the printing conditions while switching the tabs on the print setting screen.

A similar technique is provided for another type of an image processing apparatus, such as a scanner capable of scanning a document image. A scan setting screen can be displayed on the display of a computer connected to the scanner, for example. A user can request the scanner to scan a document, while setting various scanning conditions on the scan setting screen.

However, an image processing apparatus having an increasing number of functions will cause an increasingly complex setting screen. Consequently, there arises a problem that the setting options are difficult for a user to understand.

In some cases, the user should check what setting options are selected for the printing conditions (e.g., "Binding Style" or "Duplex Type") associated with the setting option (e.g., "Duplex Printing") that has been selected by him/her on the setting screen, in order to obtain the desired printing result.

When the user forgets to check the associated printing conditions, he/she may fail to obtain the desired printing result. Thus, there is a need in the art to reduce user's error in setting of printing conditions.

SUMMARY

An image processing system according to an aspect of the invention includes an image processing portion configured to process an image according to a plurality of processing conditions which are individually settable to a set value. The image processing system further includes a display portion, and an input portion configured to receive an external input. Further included is a control portion that is configured to display a setting screen on the display portion in order to receive an external input for setting the plurality of processing conditions, and is further configured to set the plurality of processing conditions according to the external input received via the input portion. The control portion displays a first setting screen as the above setting screen on the display portion, so that the set value of at least one processing condition of the plurality of processing conditions can be changed on the first setting screen according to an external input received via the input portion. The control portion additionally displays a second setting screen on the display portion in response to change of the set value of a processing condition on the first setting screen, so that the second setting screen includes information on at least one relevant processing condition associated with the changed processing condition, and the set value of the at least one relevant processing condition can be changed on the second setting screen according to an external input received via the input portion.

According to another aspect of the present invention, an image processing condition setting method for use in an image processing system is provided. The image processing system includes an image processing portion configured to process an image according to a plurality of processing conditions which are individually settable to a set value. The image processing condition setting method is provided for displaying a setting screen and setting the plurality of processing conditions according to an external input. The image processing condition setting method includes displaying a first setting screen as the above setting screen, so that the set value of at least one processing condition of the plurality of processing conditions can be changed on the first setting screen according to an external input. The image processing condition setting method further includes displaying additionally a second setting screen in response to change of the set value of a processing condition on the first setting screen, so that the second setting screen includes information on at least one relevant processing condition associated with the changed processing condition, and the set value of the at least one relevant processing condition can be changed on the second setting screen according to an external input.

An image processing condition setting system according to another aspect of the present invention includes a display portion, and a control portion capable of being connected to an image processing apparatus configured to process an image according to a plurality of processing conditions which are individually settable to a set value. The control portion is configured to display a setting screen on the display portion and set the plurality of processing conditions according to an external input. The control portion displays a first setting screen as the above setting screen on the display portion, so that the set value of at least one processing condition of the plurality of processing conditions can be changed on the first setting screen according to an external input. The control portion additionally displays a second setting screen on the display portion in response to change of the set value of a processing condition on the first setting screen, so that the second setting screen includes information on at least one relevant processing condition associated with the changed processing condition, and the set value of the at least one relevant processing condition can be changed on the second setting screen according to an external input.

According to further another aspect of the present invention, a computer program product including an image processing condition setting program is provided. The image processing condition setting program can be embodied on a computer-readable medium and is operable to implement an image processing condition setting method on a computer connected to an image processing apparatus configured to process an image according to a plurality of processing conditions which are individually settable to a set value. The computer can execute the image processing condition setting program for implementing the image processing condition setting method that is provided for displaying a setting screen and setting the plurality of processing conditions according to an external input. The image processing condition setting program includes code for displaying a first setting screen as the above setting screen, so that the set value of at least one processing condition of the plurality of processing conditions can be changed on the first setting screen according to an external input. The image processing condition setting program further includes code for displaying additionally a second setting screen in response to change of the set value of a processing condition on the first setting screen, so that the second setting screen includes information on at least one relevant processing condition associated with the changed processing condition, and the set value of the at least one relevant processing condition can be changed on the second setting screen according to an external input.

BRIEF DESCRIPTION OF THE DRAWINGS

Illustrative aspects in accordance with the invention will be described in detail with reference to the following drawings wherein.

DETAILED DESCRIPTION

Illustrative Aspect 1

An illustrative aspect 1 of the present invention will be hereinafter explained with reference to FIGS. 1 to 8.

Electrical Configuration of Printing System

Figure 1:
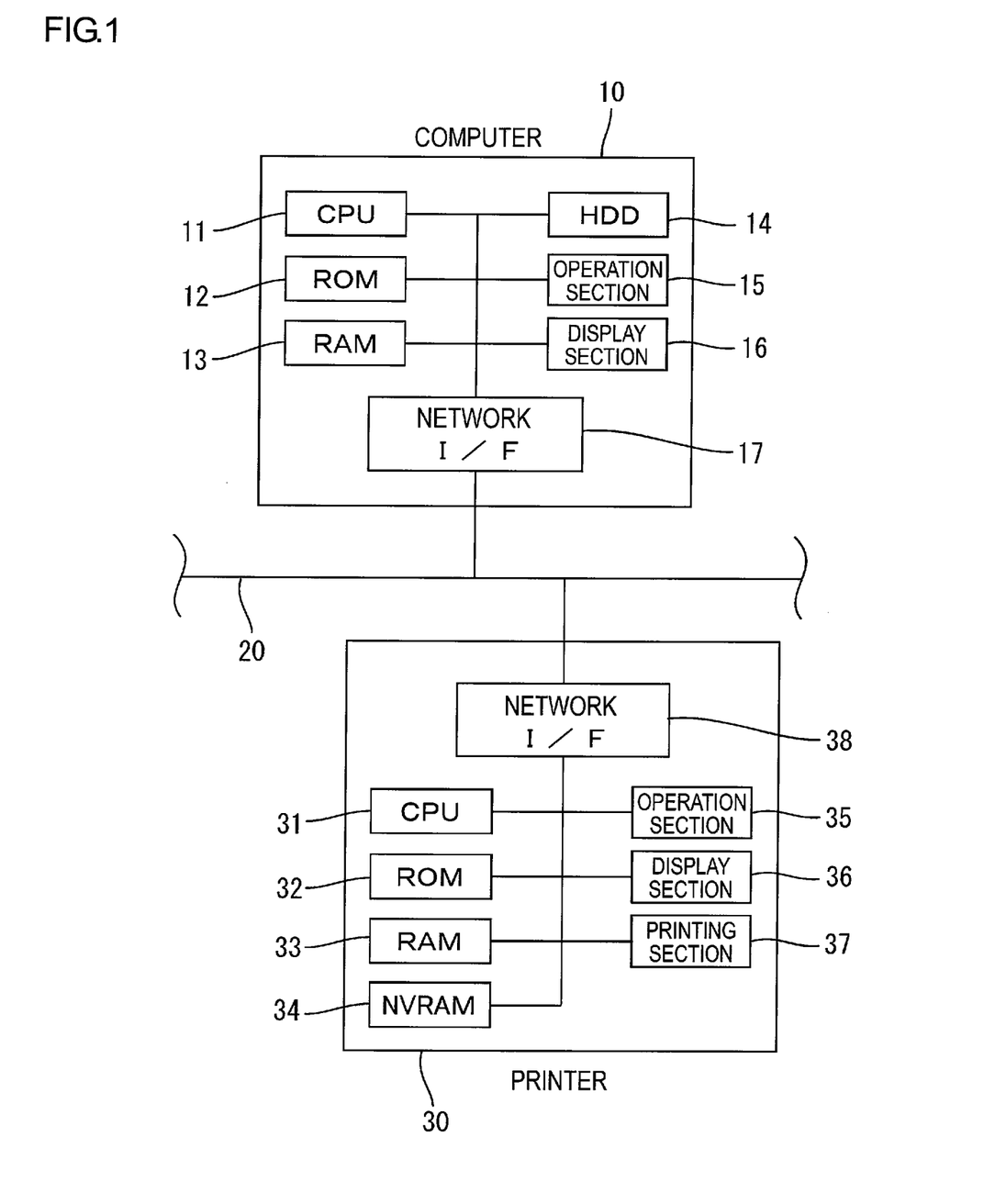
FIG. 1 is a block diagram showing the electrical configuration of a printing system.

FIG. 1 is a block diagram showing the electrical configuration of a printing system (i.e., an example of an image processing system), which includes a computer 10 and a printer 30 (i.e., an example of an image processing portion or an image processing apparatus).

The computer 10 includes a CPU 11 (i.e., an example of a control portion), a ROM 12, a RAM 13, a hard disk drive 14, an operation section 15 (i.e., an example of an input portion), a display section 16 (i.e., an example of a display portion), a network interface 17 and the like.

The operation section 15 includes a keyboard, a pointing device and the like. The display section 16 includes a liquid-crystal display and the like. The network interface 17 can be connected to a communication line 20.

The hard disk drive 14 stores various programs, such as an OS, application software programs capable of generating print object data, and a printer driver (i.e., an example of an image processing condition setting program) for controlling the printer 30.

The printer 30 includes a CPU 31, a ROM 32, a RAM 33, an NVRAM (nonvolatile memory) 34, an operation section 35, a display section 36, a printing section 37, a network interface 38 and the like.

Various programs are stored in the ROM 32. The CPU 31 controls the operation of the printer 30 based on the programs retrieved from the ROM 32, while storing the processing results in the RAM 33 and/or the NVRAM 34.

The operation section 35 includes a plurality of buttons, which enable a user to perform various input operations, such as an operation for a print request. The display section 36 can include a liquid-crystal display and indicator lamps. Thereby, various setting screens, the operating condition and the like can be displayed.

The printing section 37 has a printing function, and thereby images can be printed on both sides of a recording medium (not shown) such as paper. The network interface 38 can be connected to the external computer 10 or the like, via the communication line 20, in order to enable mutual data communication.

(Print Setting Process)

Hereinafter, a print setting process will be explained. In the present aspect, the print setting process is executed on the computer 10 for setting printing conditions as described below, and thereafter the computer 10 controls the printer 30 to print an image according to the printing conditions.

Figure 2:
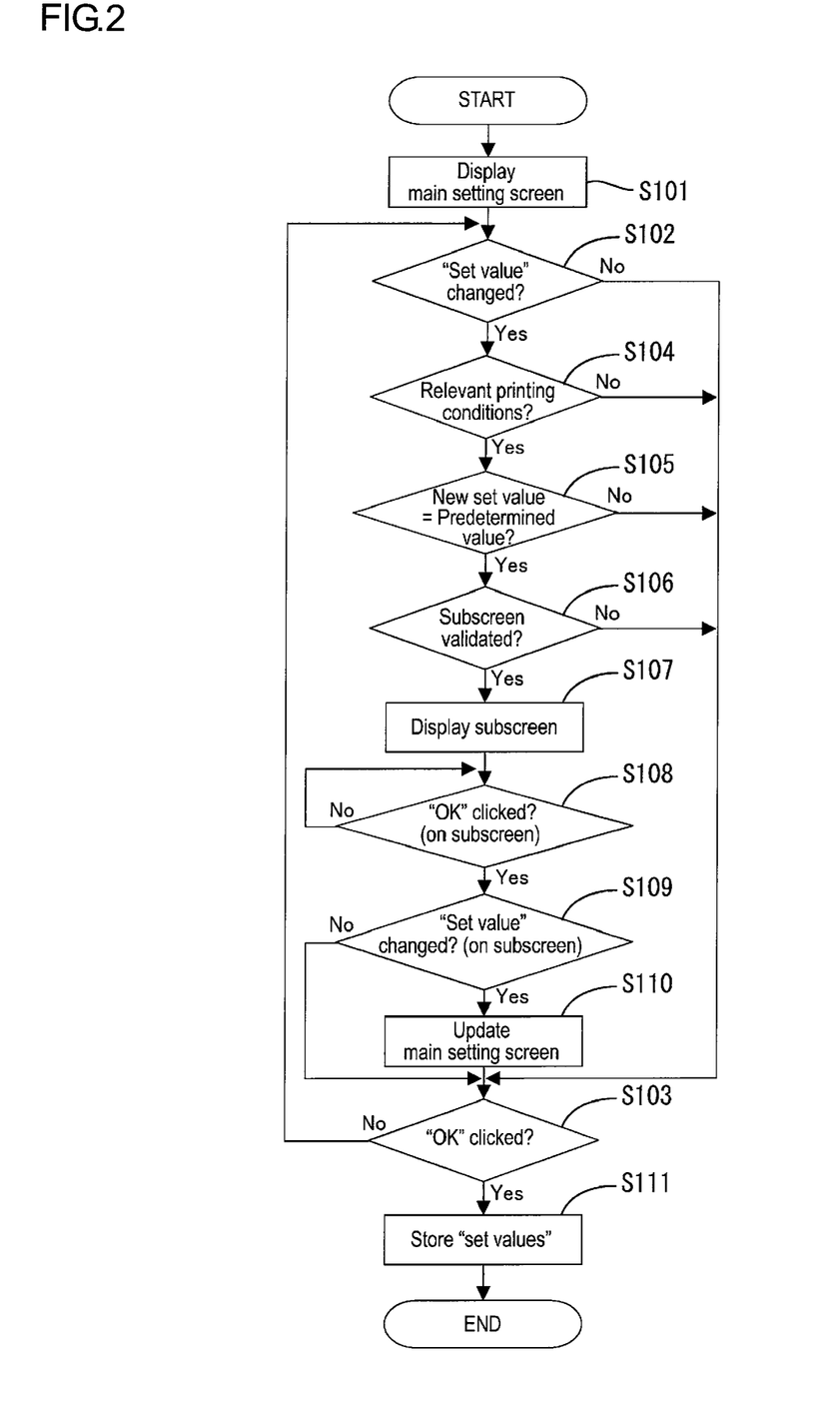
FIG. 2 is a flowchart of a print setting process.
Figure 3:
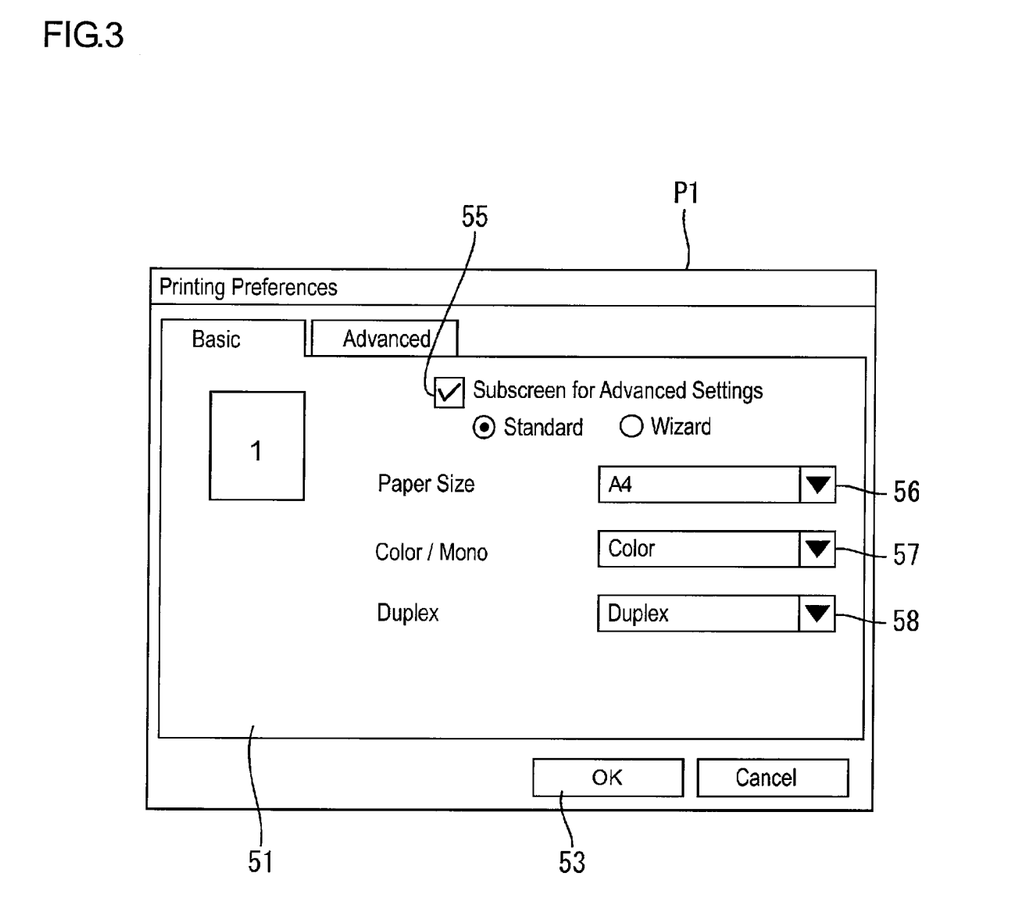
FIG. 3 is a diagram showing a main setting screen when a first tab is selected.
Figure 4:
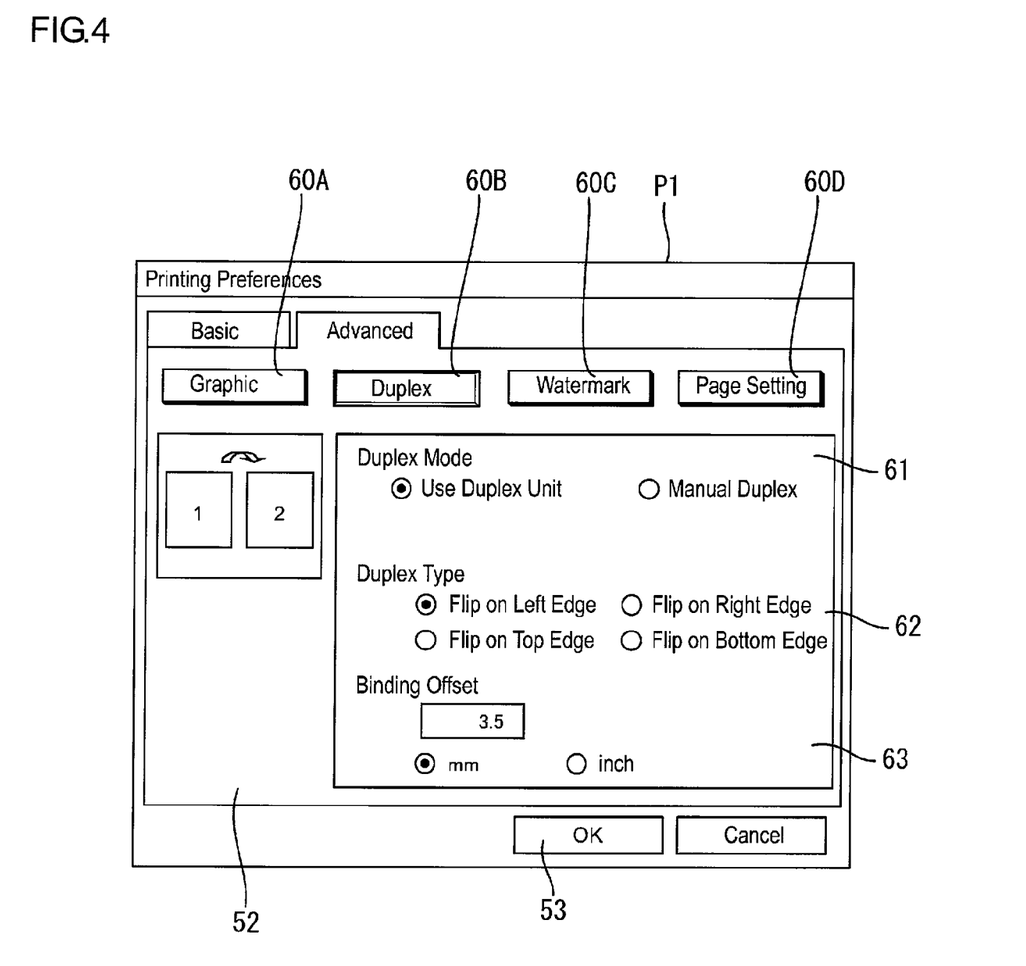
FIG. 4 is a diagram showing the main setting screen when a second tab is selected.
Figure 5:
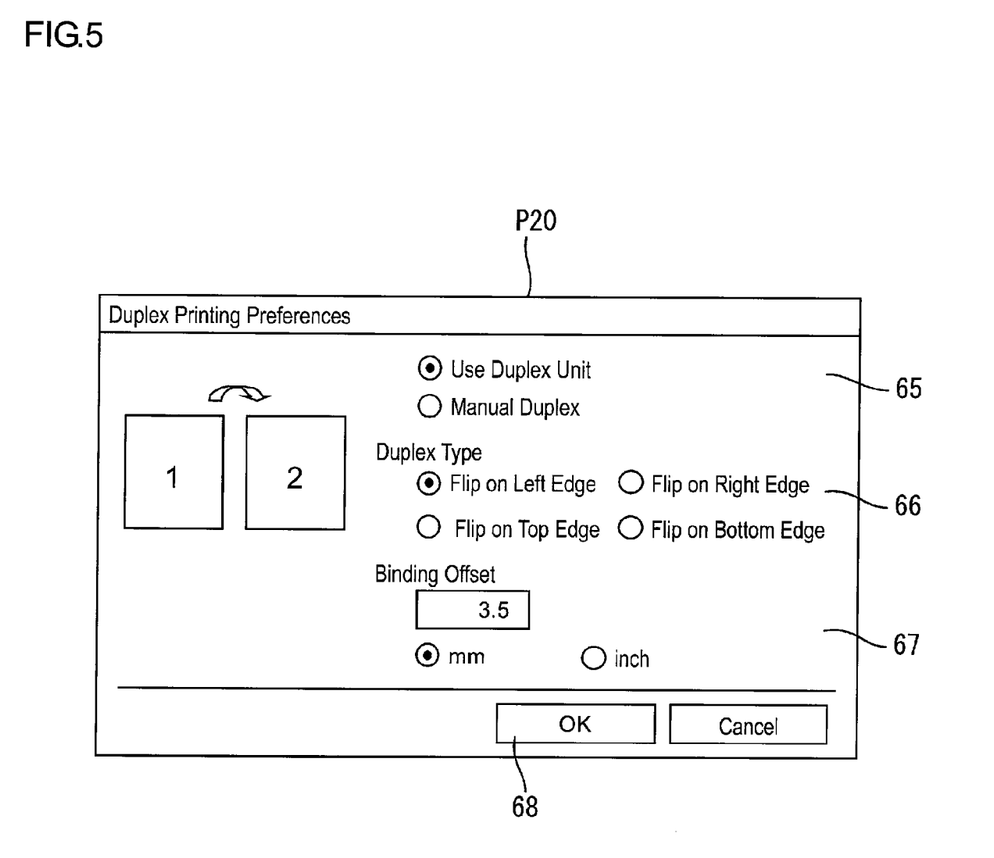
FIG. 5 is a diagram showing a standard type subscreen for advanced settings.
Figure 6:
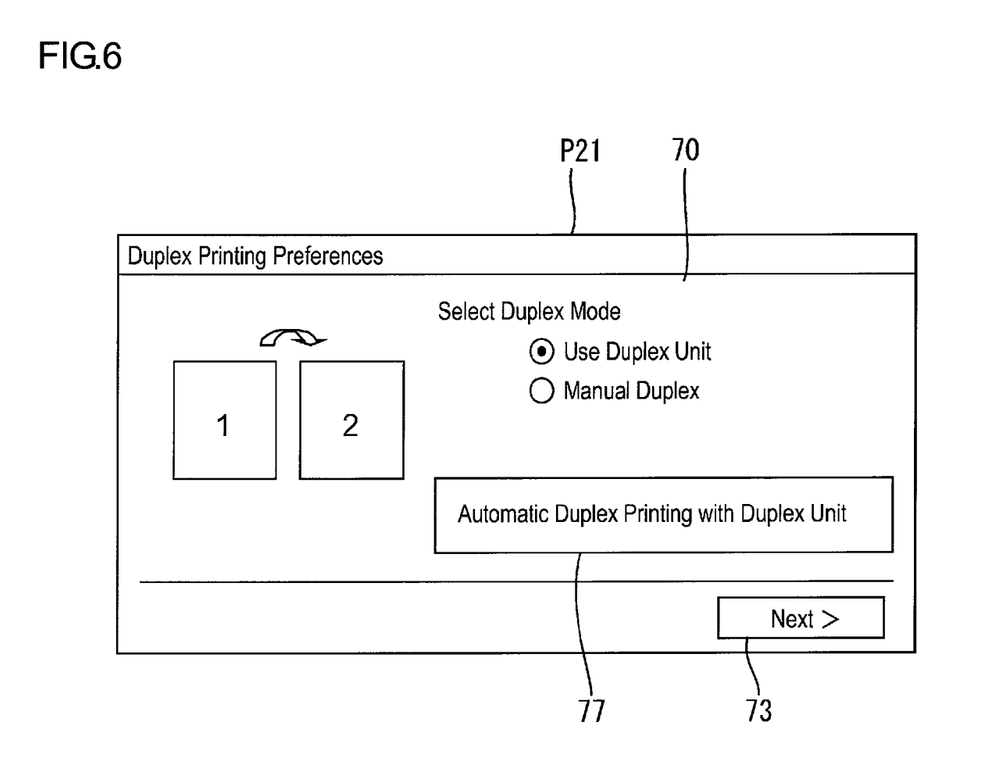
FIG. 6 is a diagram showing the first dialog box of a wizard type subscreen for advanced settings.
Figure 7:
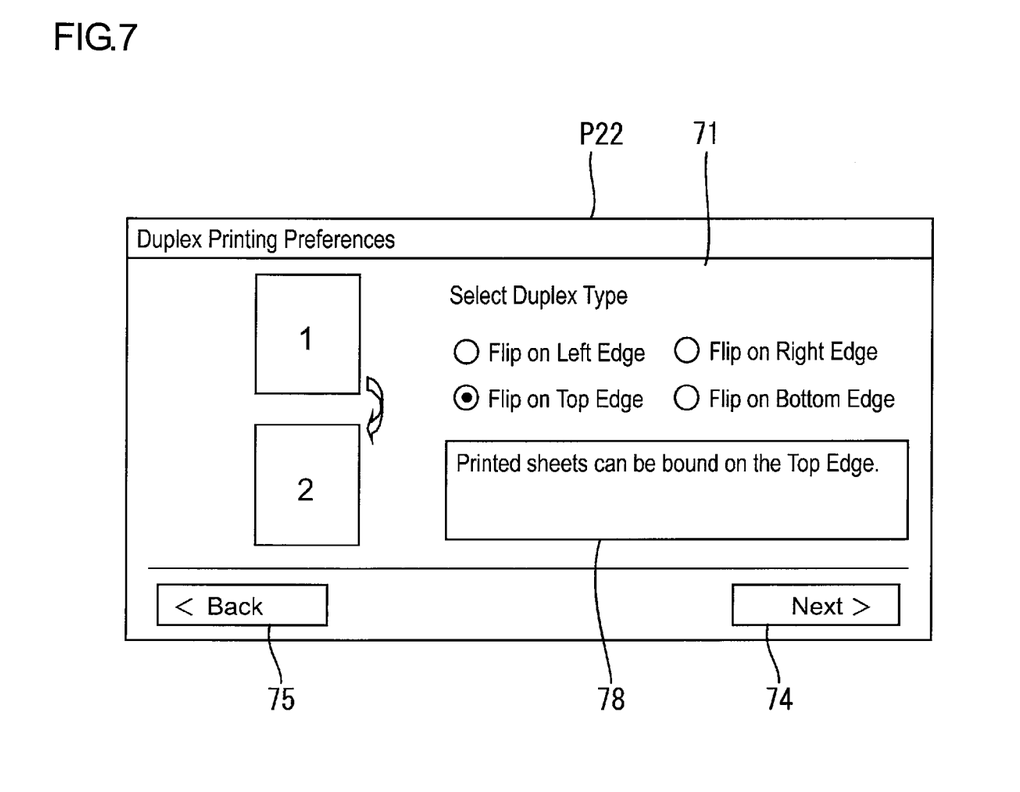
FIG. 7 is a diagram showing the second dialog box of the wizard type subscreen for advanced settings.
Figure 8:
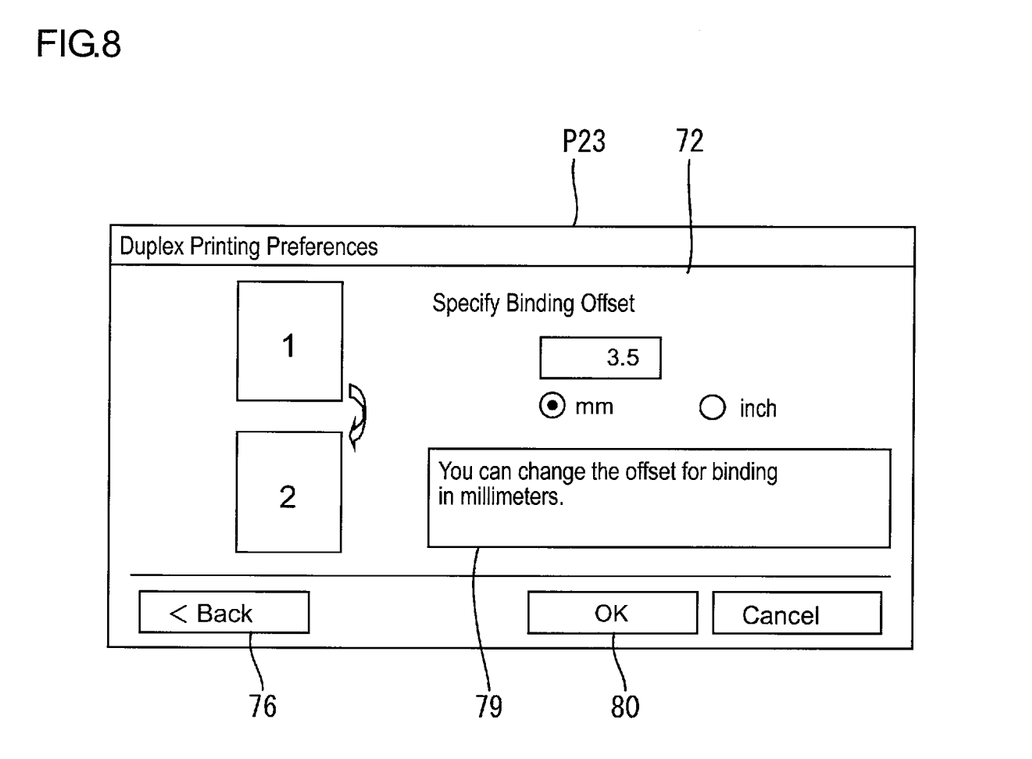
FIG. 8 is a diagram showing the third dialog box of the wizard type subscreen for advanced settings.

FIG. 2 is a flowchart of a print setting process. FIG. 3 is a diagram showing a main setting screen P1 when a first tab 51 is selected. FIG. 4 is a diagram showing the main setting screen P1 when a second tab 52 is selected. FIG. 5 is a diagram showing a standard type subscreen P20 for advanced settings. FIGS. 6 to 8 are diagrams showing the dialog boxes P21 to P23 of a wizard type subscreen for advanced settings.

When a user inputs a print request on the operation section 15 via an application software program being executed for processing text and/or image data, the CPU 11 displays a print request screen (not shown) on the display section 16. On the print request screen, the user can select a printer to be used for printing from available printers, and can request to invoke a print setting process. Further, on the print request screen, the user can request to start printing.

When the user inputs, via the operation section 15, a request to invoke a print setting process, the CPU 11 activates the printer driver corresponding to the selected printer, and executes a print setting process according to the printer driver. In the present aspect, assuming that the printer 30 shown in FIG. 1 is selected on the print request screen, a print setting process shown in FIG. 2 is executed for setting printing conditions.

During the print setting process, the CPU 11 first displays, on the display section 16, a main setting screen P1 (i.e., an example of a first setting screen) shown in FIG. 3, at step S101.

The main setting screen P1 includes a first tab 51 (or "Basic" tab) shown in FIG. 3 and a second tab 52 (or "Advanced" tab) shown in FIG. 4, one of which can be selected to be displayed on the main setting screen P1. The user can switch the first tab 51 and the second tab 52 via the operation section 15.

The main setting screen P1 further includes "OK" button 53 and the like. When the user clicks "OK" button 53, the set values or selected options currently displayed on the main setting screen P1 are fixed as the current set values of the printing conditions.

Referring to FIG. 3, the first tab 51 includes "Subscreen" selection field 55, "Paper Size" selection field 56, "Color" selection field 57 and "Duplex Printing" selection field 58.

In "Subscreen" selection field 55, the user can check or uncheck "Subscreen" option. Thereby, the user can validate or invalidate provision of a subscreen P20, or P21 to P23, which is to be displayed for advanced settings as described below. Further, in "Subscreen" selection field 55, the user can select "Standard" type or "Wizard" type for the subscreen when he/she has checked "Subscreen" option.

"Paper Size" selection field 56, "Color" selection field 57 and "Duplex Printing" selection field 58 are provided for setting printing conditions (or processing conditions). In each of the selection fields 56 to 58, the list of options can be displayed in response to a user's operation via the operation section 15, so that the user may select one from the list.

For example, two options (i.e., "Single-side Printing" and "Duplex Printing") are provided for "Duplex Printing" selection condition (i.e., an example of a processing condition), which can be displayed in "Duplex Printing" selection field 58. The user can select "Single-side Printing" option or "Duplex Printing" option in "Duplex Printing" selection field 58, as the set value or selected option for a printing condition ("Duplex Printing" selection condition).

Referring to FIG. 4, the second tab 52 is provided for advanced settings. On the second tab 52, the user can select options for printing conditions, which are not provided on the first tab 51 or are associated with the options provided on the first tab 51.

The second tab 52 includes menu buttons 60A, 60B, 60C and 60D. By clicking the menu button 60A, 60B, 60C, or 60D, the user can switch the options displayed on the second tab 52. For example, when "Duplex" menu button 60B is clicked for duplex print settings, "Duplex Mode" selection field 61, "Duplex Type" selection field 62 and "Binding Offset" setting field 63 are provided on the second tab 52.

Thus, the options for printing conditions, which are associated with an option (e.g., "Duplex Printing" option) capable of being selected on the first tab 51, can be displayed in the selection or setting fields 61 to 63 of the second tab 52.

In "Duplex Mode" selection field 61, the user can select "Use Duplex Unit" or "Manual Duplex" option for a duplex printing means. In "Duplex Type" selection field 62, the user can specify the binding style for two-side printed paper. The orientation of an image to be printed on the other side of one-side printed paper can be determined based on the specified binding style. In "Binding Offset" setting field 63, the user can specify the margin width for binding two-side printed paper.

When another menu button 60A, 60C or 60D is clicked on the second tab 52 of the main setting screen P1, the setting or selection fields for setting printing conditions associated with the clicked menu button 60A, 60C or 60D are provided on the second tab 52, in a similar manner.

Note that the setting or selection fields on the main setting screen P1 do not necessarily correspond one-to-one with the settable printing conditions. That is, the setting options for two or more printing conditions can be displayed in one field. In this case, the set values of the two or more printing conditions are determined based on the set contents of the field.

Returning to FIG. 2, the CPU 11 thus displays the main setting screen P1 on the display section 16 at step S101, and then determines at step S102 whether any of set values of printing conditions (i.e., any of selected options for printing conditions) has been changed on the main setting screen P1.

Note that the set value of a printing condition is a numeric value being assigned to and representing the selected option. The set values of the printing conditions are used by the CPU 11 for processing during the present print setting process. If the user has selected "Duplex Printing" option in "Duplex Printing" selection field 58, the value of the printing condition ("Duplex Printing" selection condition) is set to "1", for example. If the user has selected "Single-side Printing" option in "Duplex Printing" selection field 58, the value of the printing condition is set to "0", for example.

If none of the set values has been changed on the main setting screen P1 (i.e., "No" is determined at step S102), the process proceeds to step S103 where the CPU 11 determines whether "OK" button 53 is clicked on the main setting screen P1. When "OK" button 53 is not clicked ("No" is determined at step S103), the process returns to step S102 so that step S102 and the following steps are executed again.

When any of the set values or selected options has been changed on the main setting screen P1 (i.e., "Yes" is determined at step S102), the CPU 11 determines at step S104 whether the changed printing condition is associated with any of the other settable printing conditions.

It can be determined that the changed printing condition is associated with a settable printing condition, if at least one of the options provided for the changed printing condition is associated with the settable printing condition.

For example, "Duplex Printing" selection condition is associated with "Duplex Mode" selection condition, "Duplex Type" selection condition and "Binding Offset" setting condition, because "Duplex Printing" option for "Duplex Printing" selection condition is associated with "Duplex Mode" selection condition, "Duplex Type" selection condition and "Binding Offset" setting condition.

If the changed printing condition is associated with none of the other settable printing conditions (i.e., "No" is determined at step S104), the process proceeds to step S103.

If the changed printing condition is associated with at least one of the other settable printing conditions (i.e., "Yes" is determined at step S104), the CPU 11 determines at step S105 whether the new set value of the changed printing condition is equal to any of at least one predetermined value.

The predetermined value represents the set value of the changed printing condition, which corresponds to an option (for the changed printing condition) associated with at least one of the other settable printing conditions. That is, if the new set value of the changed printing condition is equal to the predetermined value, the newly selected option is associated with at least one of the other settable printing conditions, and therefore a subscreen may have to be displayed for advanced settings.

For example, as for "Duplex Printing" selection condition, the set value (e.g., "1") when "Duplex Printing" option is selected in "Duplex Printing" selection field 58 is used as a predetermined value at step S105. That is, a subscreen may have to be displayed for advanced settings (i.e., for settings of the relevant or associated printing conditions), when "Duplex Printing" option is selected in "Duplex Printing" selection field 58.

In contrast, the set value (e.g., "0") when "Single-side Printing" option is selected in "Duplex Printing" selection field 58 is not used as a predetermined value at step S105, because "Single-side Printing" option is associated with none of the other settable printing conditions.

If the new set value of the changed printing condition is not equal to a predetermined value (i.e., "No" is determined at step S105), the process proceeds to step S103.

If the new set value of the changed printing condition is equal to a predetermined value (i.e., "Yes" is determined at step S105), the CPU 11 determines at step S106 whether provision of a subscreen is validated on the main setting screen P1 (i.e., whether "Subscreen" option is checked in "Subscreen" selection field 55). If provision of a subscreen is invalidated (i.e., "No" is determined at step S106), the process proceeds to step S103.

When provision of a subscreen is validated (i.e., "Yes" is determined at step S106), the CPU 11 displays, at step S107, a subscreen (i.e., an example of a second setting screen) as a new screen (or a child screen of the main setting screen P1) on the display section 16. The subscreen includes fields for setting relevant printing conditions associated with the changed printing condition.

For example, when the user has changed the option selected in "Duplex Printing" selection field 58 of the main setting screen P1 from "Single-side Printing" to "Duplex Printing", the set values or selected options currently displayed in "Duplex Mode" selection field 61, "Duplex Type" selection field 62 and "Binding Offset" setting field 63 of the second tab 52 of the main setting screen P1 are retrieved and displayed on the subscreen.

Thus, the current set values on the second tab 52 are displayed in the fields of the subscreen, as initial values of the relevant printing conditions.

As described above, two types of subscreen, i.e., a standard type subscreen P20 shown in FIG. 5 and a wizard type subscreen P21 to P23 shown in FIGS. 6 to 8, are provided in the present aspect. The user can select one of the two types on the first tab 51 of the main setting screen P1, when "Subscreen" option is checked in "Subscreen" selection field 55. At step S107, the subscreen of the type selected in "Subscreen" selection field 55 is displayed on the display section 16.

As shown in FIG. 5, the standard type subscreen P20 is formed of one screen that includes "Duplex Mode" selection field 65, "Duplex Type" selection field 66 and "Binding Offset" setting field 67. The same options as selected in the fields 61 to 63 of the main setting screen P1 are displayed as initial values in the fields 65 to 67 of the subscreen P20, as described above.

On the subscreen P20, the user can change the set values or selected options in the fields 65 to 67, as on the main setting screen P1. If the user clicks "OK" button 68, the set values or selected options currently displayed on the subscreen P20 are fixed as the current set values or currently selected options.

While the subscreen P20 is displayed on the display section 16, the CPU 11 deactivates or locks the main setting screen P1 so that the user cannot perform an operation (e.g., clicking) on the main setting screen P1 via the operation section 15.

On the other hand, the wizard type subscreen is targeted at users unused to setting printing conditions, and is formed of three dialog boxes P21 to P23 shown in FIGS. 6 to 8. The dialog boxes P21 to P23 are sequentially displayed on the display section 16, so that the user can select an option for one of the relevant printing conditions on each dialog box P21, P22 or P23. The user can set the relevant printing conditions while answering the questions displayed on the dialog boxes P21 to P23.

For example, the dialog boxes P21 to P23 include "Duplex Mode" selection field 70, "Duplex Type" selection field 71 and "Binding Offset" setting field 72, respectively. When the user clicks "Next" button 73 or 74 on the dialog box P21 or P22, the next dialog box P22 or P23 is displayed on the display section 16. When the user clicks "Back" button 75 or 76 on the dialog box P22 or P23, the previous dialog box P21 or P22 is displayed on the display section 16.

The dialog boxes P21 to P23 include guide sections 77 to 79, so as to provide text and/or pictorial instructions for setting the relevant printing conditions.

The same options as selected in the fields 61 to 63 of the main setting screen P1 are displayed as initial values in the selection or setting fields 70 to 72 of the dialog boxes P21 to P23, as on the standard type subscreen P20.

On the dialog boxes P21 to P23, the user can change the set values or selected options in the fields 70 to 72 for the relevant printing conditions. If the user clicks "OK" button 80 on the last or third dialog box P23, the set values or selected options, which are displayed on the dialog boxes P21 to P23 at the time of clicking of "Next" button 73 or 74 or "OK" button 80, are fixed as the current set values or currently selected options for the relevant printing conditions.

While the dialog box P21 P22 or P23 (i.e., the wizard type subscreen) is displayed on the display section 16, the CPU 11 deactivates or locks the main setting screen P1 so that the user cannot perform an operation (e.g., clicking) on the main setting screen P1 via the operation section 15.

Returning to FIG. 2, the CPU 11 thus displays the subscreen P20, or P21 to P23 at step S107, and then determines at step S108 whether "OK" button 68 or 80 is clicked on the standard type subscreen P20 or on the last dialog box P23 of the wizard type subscreen.

When "OK" button 68 or 80 is not clicked yet (i.e., "No" is determined at step S108), the CPU 11 iterates execution of step S108, and thereby waits for clicking of "OK" button 68 or 80.

When "OK" button 68 or 80 is clicked (i.e., "Yes" is determined at step S108), the CPU 11 closes the subscreen P20 or the last dialog box P23, and activates the main setting screen P1. Further, the CPU 11 determines at step S109 whether any of the set values or selected options has been changed on the subscreen P20, or P21 to P23.

When any of the set values or selected options has been changed (i.e., "Yes" is determined at step S109), the CPU 11 updates the main setting screen P1 at step S110, so that the new set values or newly selected options are reflected on the main setting screen P1.

When "OK" button 53 is clicked on the main setting screen P1 (i.e., "Yes" is determined at step S103), the set values or selected options currently displayed on the main setting screen P1 are stored in the RAM 13 at step S111. Then, the main setting screen P1 is closed, and the present print setting process is completed.

If the user thereafter requests on the above-described print request screen to start printing, the CPU 11 generates printing data according to the printer driver. Specifically, the printing data is generated from the print object page data based on the various printing conditions having been set during the above print setting process.

The generated printing data is expressed in a PDL (Page Description Language), for example, and includes the setting information on the printing conditions, and the like, as well as the image data. The printing data is sent to the printer 30 via the network interface 17.

On the other hand, the printer 30 receives the printing data from the computer 10, via the network interface 38. The printing data is developed into bitmap data, under control of the CPU 31. The resultant data is sent to the printing section 37, so that printing is performed. At the time, the printing is performed so as to comply with the printing conditions prescribed in the setting information included in the printing data.

(Effect of the Present Aspect)

According to the present aspect, when the set value of a printing condition has been changed on the main setting screen P1 (e.g., when the selected option has been changed in "Duplex Printing" selection field 58), a subscreen P20, or P21 to P23 is additionally displayed on the display section 16. The subscreen P20, or P21 to P23 includes information on relevant printing conditions (i.e., printing conditions associated with the changed printing condition), and the set values of the relevant printing conditions can be changed on the subscreen P20, or P21 to P23.

According to the construction, a user can easily know the relevant printing conditions from the subscreen P20, or P21 to P23, and can check what setting options are selected for the relevant printing conditions. Thereby, the user's error in setting of printing conditions can be reduced.

When the new set value of the changed printing condition is equal to a predetermined value (e.g., when the option newly selected in the "Duplex Printing" selection field 58 is "Duplex Printing"), the relevant printing conditions associated with the predetermined value (e.g., associated with "Duplex Printing" option) are displayed on the subscreen P20, or P21 to P23.

Thus, the relevant printing conditions associated with the newly selected option can be selectively displayed on the subscreen P20, or P21 to P23. That is, the printing conditions irrelevant to the newly selected option are not displayed on the subscreen P20, or P21 to P23, and therefore the user can know exactly what printing conditions should be checked in order to obtain the desired printing result.

In the present aspect, the main setting screen P1 is deactivated while the subscreen P20, or P21 to P23 is displayed on the display section 16. Thereby, the user can know which screen to use for operation.

In general, the setting options for printing conditions may be categorized onto tabs provided on the main setting screen, and accordingly the relevant printing conditions associated with the printing conditions displayed on a first tab can be displayed on a second tab, as in the present aspect.

In this case, it may be hard for the user to find the relevant printing conditions while switching the tabs 51, 52 on the main setting screen P1, when he/she has changed the set value or selected option for a printing condition on the first tab 51.

In view of this, according to the present aspect, a subscreen P20, or P21 to P23 dedicated for setting the relevant printing conditions is displayed as a new screen on the display section 16, when the user has changed the set value or selected option for a printing condition on the first tab 51 of the main setting screen P1.

For example, "Duplex Mode" selection field 65 or 70, "Duplex Type" selection field 66 or 71, and "Binding Offset" setting field 67 or 72 are provided on the subscreen P20, or P21 to P23, when the user has selected "Duplex Printing" option in the "Duplex Printing" selection field 58 of the main setting screen P1, as described above.

According to the construction, the user can easily know the relevant printing conditions, and can check what setting options are selected for the relevant printing conditions. Thereby, the user's error in setting of printing conditions can be reduced.

When the set values or selected options have been changed for relevant printing conditions on the subscreen P20 or P21 to P23, the change is reflected to the second tab 52 of the main setting screen P1 after the close of the subscreen P20 or P23, so that the new values or newly selected options are displayed on the second tab 52 of the main setting screen P1.

Thereby, the inconsistency in the set values of the printing conditions and the subsequent problems can be prevented.

The wizard type subscreen is formed of dialog boxes P21 to P23, which are sequentially displayed on the display section 16. Therefore, the user can readily set the relevant printing conditions while answering the questions displayed on the dialog boxes P21 to P23, even if he/she is not used to setting printing conditions.

In the present aspect, the subscreen P20, or P21 to P23 can be prevented from being displayed in response to change of a set value or selected option on the main setting screen P1, if invalidation of a display of the subscreen P20, or P21 to P23 is requested by the user, for example.

Thus, provision of the subscreen P20, or P21 to P23 can be invalidated on request, and thereby the convenience of print settings for the user can be improved.

<Other Illustrative Aspects>

The present invention is not limited to the aspect explained in the above description made with reference to the drawings. The following aspects may be included in the technical scope of the present invention, for example.

(1) In the above aspect, the configurations of various screens and the setting options for the printing conditions are shown for illustrative purposes. They can be varied in various ways.

(2) In the above aspect, a printing system including a computer 10 and a printer 30 is shown for illustrative purposes. However, referring to FIG. 9, the present invention can be applied to a scanning system (i.e., an example of an image processing system) that includes a computer 10 and a multifunction printer 90 (i.e., an example of an image processing portion or an image processing apparatus) having a scanning section 91 capable of scanning a document, for example.

Figure 9:
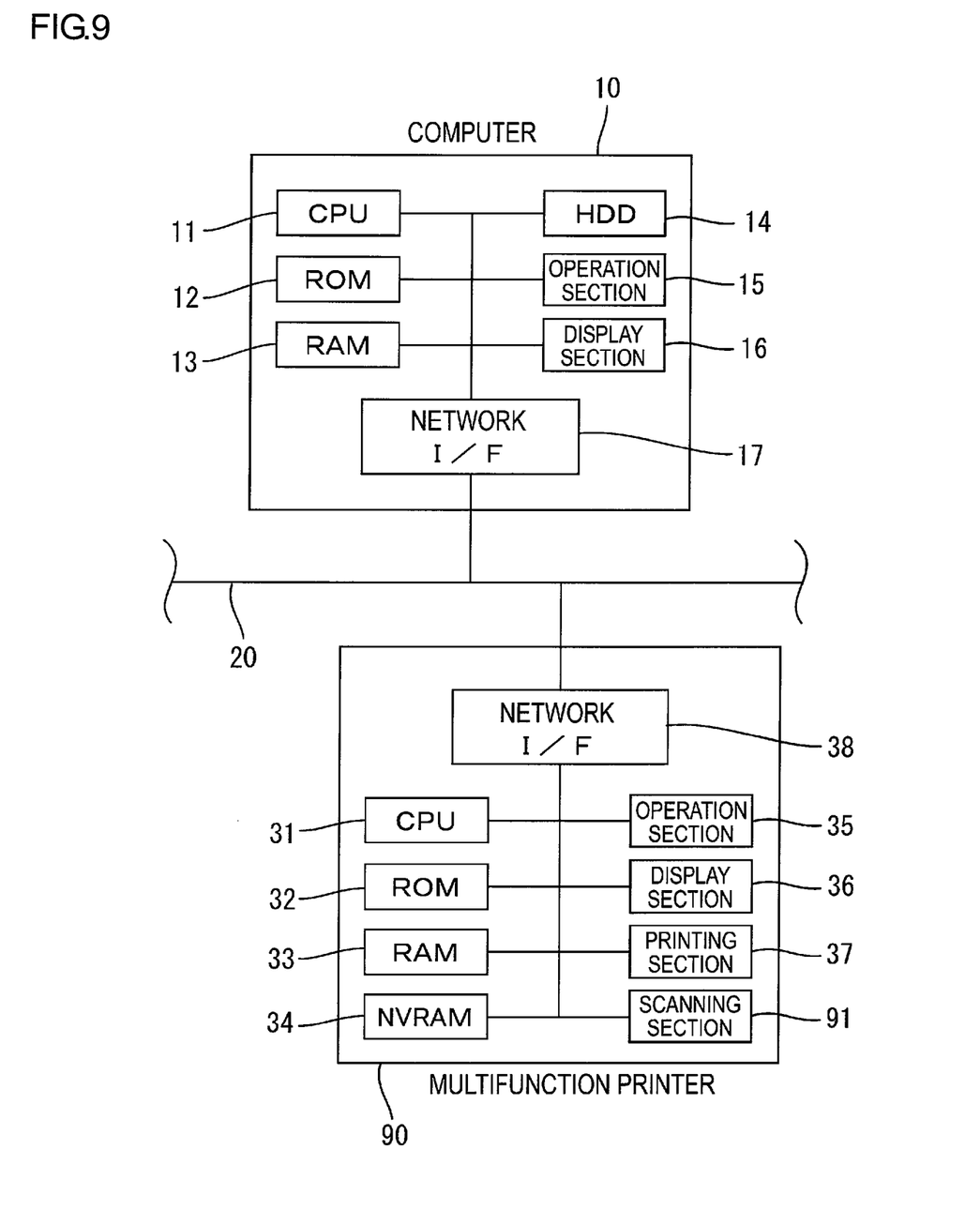
FIG. 9 is a block diagram showing the electrical configuration of a scanning system.
Figure 10:
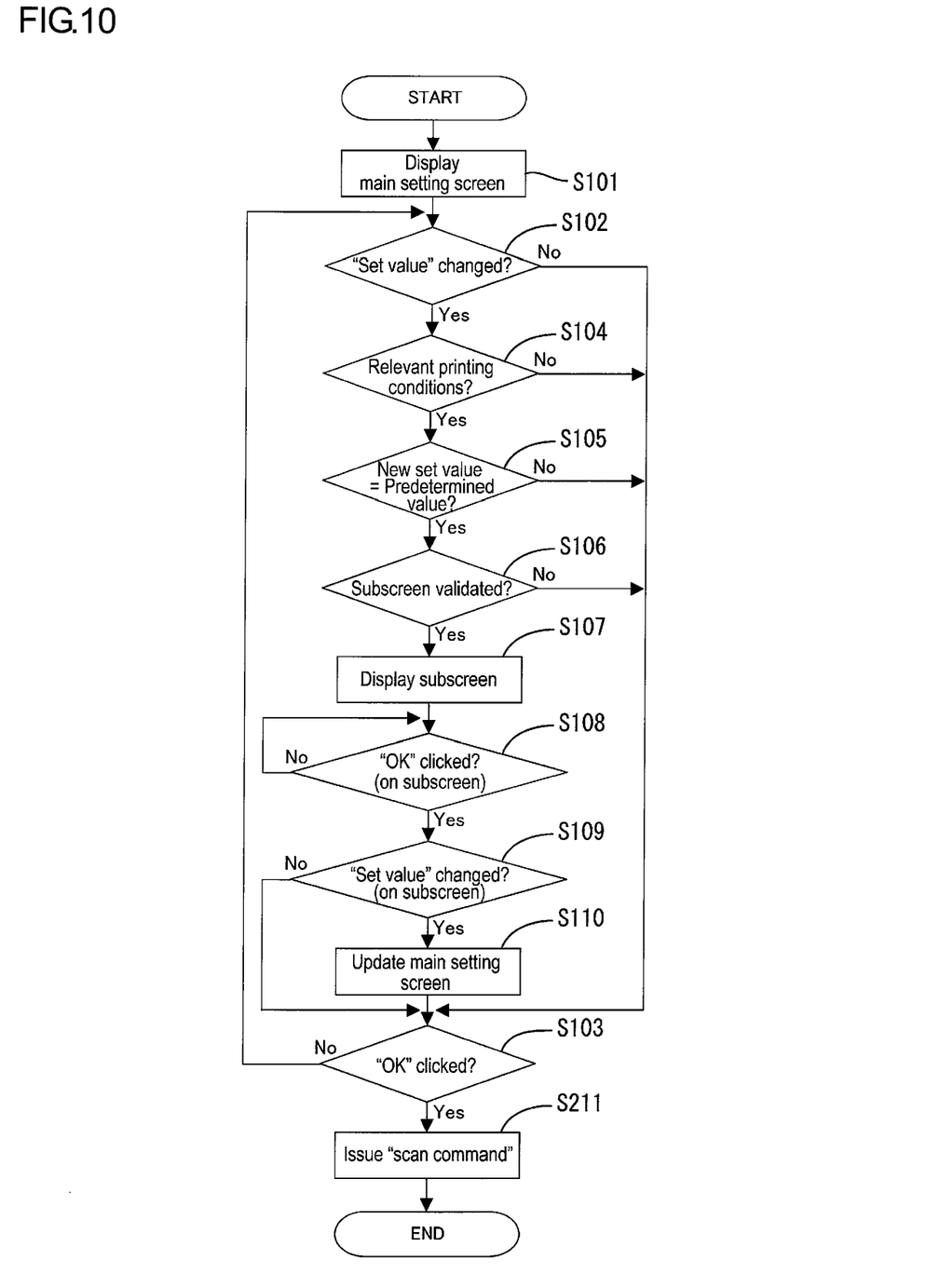
FIG. 10 is a flowchart of a scan setting process.

In the scanning system, the CPU 11 of the computer 10 activates a scanner driver so as to start a scan setting process shown in FIG. 10, when a user requests, via the operation section 15, to scan a document placed on the scanning section 91 of the multifunction printer 90.

The scan setting process is substantially similar to the print setting process shown in FIG. 2, and therefore will be briefly described.

Referring to FIG. 10, the setting options for various scanning conditions, such as "Document Size", "Color Format", "Image Type" and "Brightness", can be displayed at step S101 on a main setting screen (not shown), so that the user can set the scanning conditions on the main setting screen.

When the user has changed the set value of a scanning condition on the main setting screen (i.e., "Yes" is determined at step S102), a subscreen (not shown) is displayed as a new screen on the display section 16 at step S107 if "Yes" is determined at steps S104 to S106. On the subscreen, the user can change the set values of the relevant scanning conditions associated with the changed scanning condition.

When "OK" button is clicked on the main setting screen (i.e., "Yes" is determined at step S103), the CPU 11 issues, at step S211, a scan command that includes the setting information on the scanning conditions having been set on the main setting screen or on the subscreen. The scan command is sent to the multifunction printer 90, so that scanning is performed by the scanning section 91.

(3) In the above aspects, a printing or scanning system, in which a printer 30 or a multifunction printer 90 and a computer 10 are connected via a network, is shown for illustrative purposes. However, the present invention can be applied to a stand-alone printer or a stand-alone scanner.

In the multifunction printer 90 (as a stand-alone printer) shown in FIG. 9, the setting screens according to the present invention may be displayed on the display section 36 (display portion) under control of the CPU 31 (control portion) so that a user can set the printing conditions via the operation section 35 (input portion), when printing is performed using data retrieved from an external storage device such as a USB memory or using image data having been obtained by scanning a document on the scanning section 91, for example.

Further, in the multifunction printer 90 (as a stand-alone scanner), the setting screens according to the present invention may be displayed on the display section 36 under control of the CPU 31 so that a user can set the scanning conditions via the operation section 35, when a document placed on the scanning section 91 is scanned.

(4) In the above aspect, a subscreen can be provided only when the new value of a printing condition having been changed on the main setting screen P1 is equal to a predetermined value (e.g., when "Duplex Printing" option is newly selected by a user in "Duplex Printing" selection field 58).

However, according to the present invention, a subscreen may be provided regardless of the new set value, when a predetermined type of printing condition has been changed on the main setting screen P1. For example, a subscreen for page settings may be provided whenever the user has changed "Paper Size" selection condition in "Paper Size" selection field 56 of the main setting screen P1.

In this case, some of the relevant printing conditions to be displayed on the subscreen may be eliminated depending on the new set value of the changed printing condition. For example, "Paper Source" selection field may be eliminated from the subscreen provided for page settings, only when "A4" has been newly selected by the user in "Paper Size" selection field 56 of the main setting screen P1.

(5) In the above aspect, the printing conditions are set according to a user's input received via the operation section 15. However, the printing conditions may be set according to an external input other than a user's input.

For example, an automatic setting program, such as a macro program, for duplex print settings may be executed instead of user's input operations. In this case, the print setting process can receive an external input from a process being executed based on the automatic setting program, via an inter-process interface (i.e., an example of an input portion), so as to set the printing conditions according to the received external input.

What is claimed is:

1. An image processing system comprising:
    an image processing portion configured to process an image according to a plurality of processing conditions which are individually settable to a set value;
    a display portion;
    an input portion configured to receive an external input; and
    a control portion configured to display a setting screen on said display portion in order to receive an external input for setting said plurality of processing conditions, and set said plurality of processing conditions according to the external input received via said input portion, wherein:
    said control portion displays a first setting screen as said setting screen on said display portion, so that a set value of at least one processing condition of said plurality of processing conditions is capable of being changed on said first setting screen according to an external input received via said input portion;
    said control portion additionally displays a second setting screen on said display portion in response to change of a set value of a processing condition on said first setting screen, so that said second setting screen includes information on at least one relevant processing condition associated with said changed processing condition, and a set value of said at least one relevant processing condition is capable of being changed on said second setting screen according to an external input received via said input portion, and
    said control portion prevents said second setting screen from being displayed in response to change of a set value of a processing condition on said first setting screen, if invalidation of a display of said second setting screen is requested,
    wherein, when a new set value of said changed processing condition is equal to a predetermined value, a set value of at least one relevant processing condition associated with said predetermined value of said changed processing condition is capable of being changed on said second setting screen,
    said first setting screen includes a plurality of switchable tabs, so that a set value of at least one processing condition of said plurality of processing conditions is capable of being changed on each of said plurality of tabs according to an external input received via said input portion;
    said second setting screen is displayed in response to change of a set value of a processing condition on a first tab of said plurality of tabs; and
    a set value of at least one relevant processing condition capable of being changed on said second setting screen is capable of being alternatively changed on a second tab of said plurality of tabs.

2. An image processing system as in claim 1, wherein said control portion deactivates said first setting screen so that an operation on said first setting screen via said input portion is prevented, while said second setting screen is displayed on said display portion.

3. An image processing system as in claim 1, wherein, in response to change of a set value of at least one relevant processing condition on said second setting screen, said control portion reflects the change to said second tab of said first setting screen.

4. An image processing system as in claim 1, wherein:
    said second setting screen includes at least one dialog box; and
    when said changed processing condition is associated with a plurality of relevant processing conditions, said second setting screen includes a plurality of dialog boxes to be displayed sequentially, so that said plurality of relevant processing conditions are capable of being set through said plurality of dialog boxes.

5. An image processing condition setting method for use in an image processing system that includes an image processing portion configured to process an image according to a plurality of processing conditions which are individually settable to a set value, said image processing condition setting method being provided for displaying a setting screen and setting said plurality of processing conditions according to an external input, and comprising:
    displaying a first setting screen as said setting screen, so that a set value of at least one processing condition of said plurality of processing conditions is capable of being changed on said first setting screen according to an external input; and
    displaying additionally a second setting screen in response to change of a set value of a processing condition on said first setting screen, so that said second setting screen includes information on at least one relevant processing condition associated with said changed processing condition, and a set value of said at least one relevant processing condition is capable of being changed on said second setting screen according to an external input; and preventing said second setting screen from being displayed in response to change of a set value of a processing condition on said first setting screen, if invalidation of a display of said second setting screen is requested, wherein, when a new set value of said changed processing condition is equal to a predetermined value, a set value of at least one relevant processing condition associated with said predetermined value of said changed processing condition is capable of being changed on said second setting screen, said first setting screen includes a plurality of switchable tabs, so that a set value of at least one processing condition of said plurality of processing conditions is capable of being changed on each of said plurality of tabs according to an external input;

said second setting screen is displayed in response to change of a set value of a processing condition on a first tab of said plurality of tabs; and a set value of at least one relevant processing condition capable of being changed on said second setting screen is capable of being alternatively changed on a second tab of said plurality of tabs.

6. An image processing condition setting method as in claim 5, further comprising deactivating said first setting screen so that an operation on said first setting screen is prevented, while said second setting screen is displayed.

7. An image processing condition setting method as in claim 5, wherein:

said second setting screen includes at least one dialog box; and when said changed processing condition is associated with a plurality of relevant processing conditions, said second setting screen includes a plurality of dialog boxes to be displayed sequentially, so that said plurality of relevant processing conditions are capable of being set through said plurality of dialog boxes.

* * * * *